United States Patent
Kumar et al.

[11] Patent Number: 6,097,954
[45] Date of Patent: *Aug. 1, 2000

[54] METHOD FOR PERFORMING A SOFT HANDOFF

[75] Inventors: Sarath Kumar, Eatontown; Wen-Yi Kuo, Parsippany; Kiran M. Rege, Marlboro, all of N.J.

[73] Assignee: Lucent Technologies, Inc., Murray Hill, N.J.

[*] Notice: This patent is subject to a terminal disclaimer.

[21] Appl. No.: 08/920,779

[22] Filed: Aug. 29, 1997

[51] Int. Cl.$^7$ ........................................... H09K 1/00
[52] U.S. Cl. ................................. 455/442; 455/33; 375/1
[58] Field of Search ................................. 455/436, 439, 455/438, 442, 443; 370/331, 332, 333, 321

[56] References Cited

U.S. PATENT DOCUMENTS

| | | | |
|---|---|---|---|
| 5,101,501 | 3/1992 | Gilhousen et al. | 455/33 |
| 5,267,261 | 11/1993 | Blakeney, II et al. | 375/1 |
| 5,420,863 | 5/1995 | Taketsugu et al. | 370/95.3 |
| 5,594,718 | 1/1997 | Weaver, Jr. et al. | 370/331 |
| 5,594,781 | 1/1997 | Kozdon et al. | 379/60 |
| 5,640,414 | 6/1997 | Blakeney, II et al. | 375/200 |
| 5,848,063 | 12/1998 | Weaver, Jr. et al. | 370/331 |

FOREIGN PATENT DOCUMENTS

0471656A2  8/1991  European Pat. Off. .......... H04B 7/26

OTHER PUBLICATIONS

S. T. S. Chia, "Mixed Cell Architecture and Handover," IEE Colloquium on Mobile Communications in The Year 2000, Jun. 9, 1992, pp. 10/1–10/5.

*Primary Examiner*—Daniel S. Hunter
*Assistant Examiner*—Pablo N. Tran

[57] ABSTRACT

The present invention increases the success rate of soft handoffs by enhancing the ability of a mobile-telephone to receive a handoff direction message that identifies the traffic channel being assigned to enable a candidate base station to communicate with the mobile-telephone. Specifically, the aforementioned ability of the mobile-telephone is enhanced by using the candidate base station to transmit the handoff direction message on a communication channel belonging to the candidate base station and being listened to by the mobile-telephone. In situations where signals transmitted from active set base stations have a low signal-to-noise ratio at the mobile-telephone, signals transmitted from the candidate base station may have a higher signal-to-noise ratio at the mobile-telephone. In these situations, the transmission of the HD messages from the candidate base station increases the likelihood that a copy of the handoff direction message will be successfully received by the mobile-telephone, thereby enhancing the success rate of soft handoffs.

25 Claims, 6 Drawing Sheets

FIG. 6

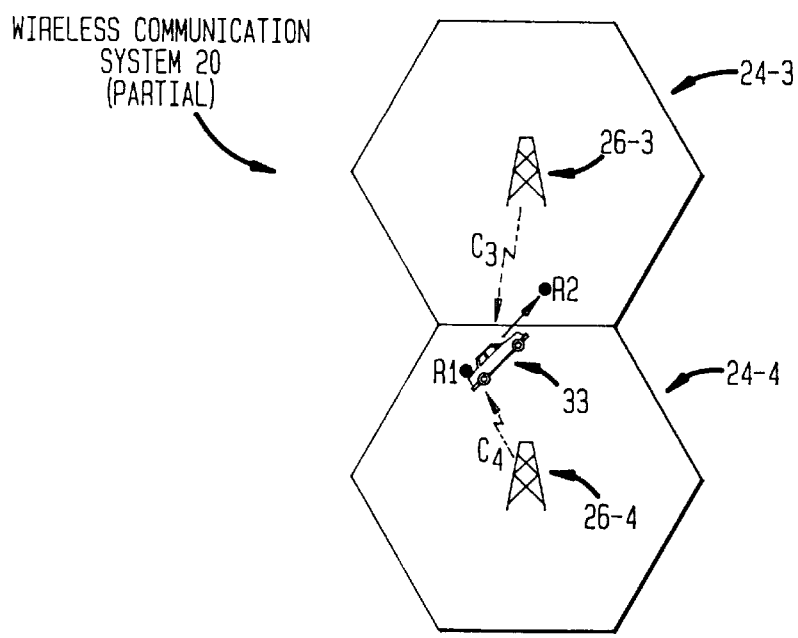

WIRELESS COMMUNICATION SYSTEM 20 (PARTIAL)

FIG. 8

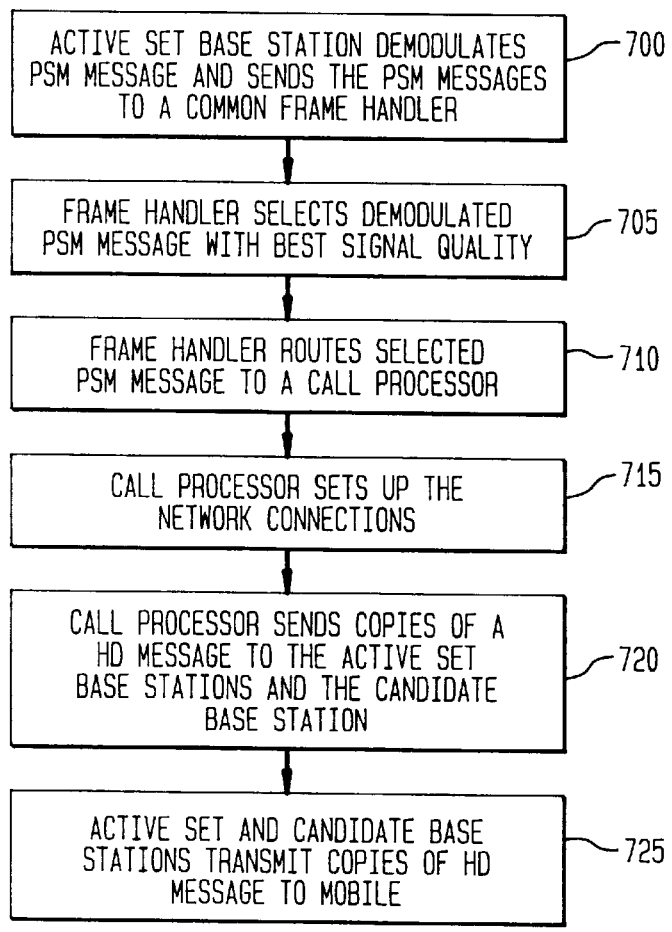

BASE STATION FLOWCHART 70

- 700 ACTIVE SET BASE STATION DEMODULATES PSM MESSAGE AND SENDS THE PSM MESSAGES TO A COMMON FRAME HANDLER
- 705 FRAME HANDLER SELECTS DEMODULATED PSM MESSAGE WITH BEST SIGNAL QUALITY
- 710 FRAME HANDLER ROUTES SELECTED PSM MESSAGE TO A CALL PROCESSOR
- 715 CALL PROCESSOR SETS UP THE NETWORK CONNECTIONS
- 720 CALL PROCESSOR SENDS COPIES OF A HD MESSAGE TO THE ACTIVE SET BASE STATIONS AND THE CANDIDATE BASE STATION
- 725 ACTIVE SET AND CANDIDATE BASE STATIONS TRANSMIT COPIES OF HD MESSAGE TO MOBILE

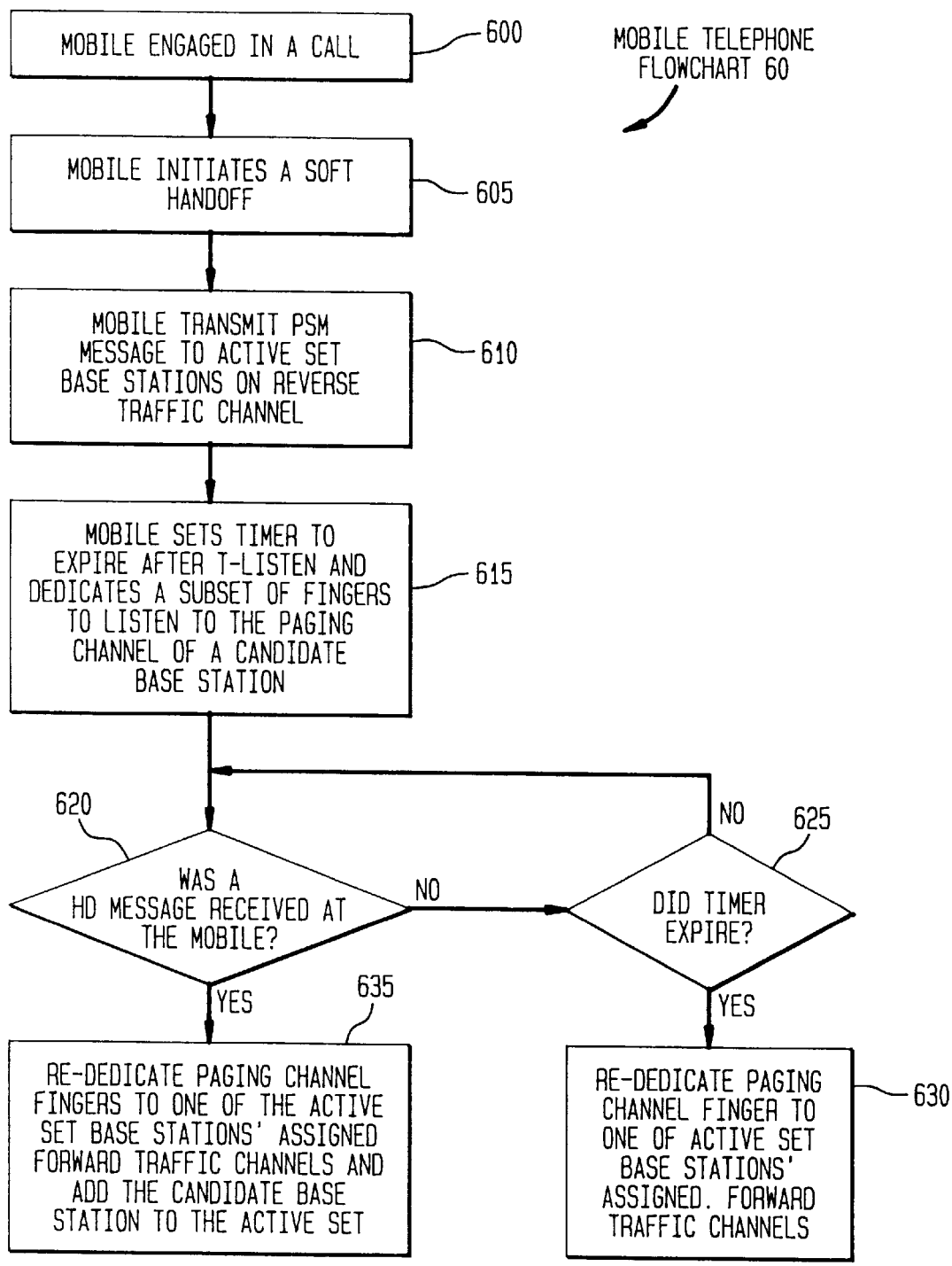

METHOD FOR PERFORMING A SOFT HANDOFF

CROSS REFERENCES

The present invention is related to application Ser. No. 08/866,759 filed May 30, 1997, entitled "Robust CDMA Soft Handoff" by S. Kumar, W. Y. Kuo and K. Rege.

1. Field of the Invention

The present invention relates to wireless communication systems and, in particular, to performing a soft handoff in a wireless communication system.

2. Background of the Invention

Soft handoffs enable mobile-telephones to keep calls active without a user-detectable disruption of communication as the mobile-telephones move from the coverage area of one base station to that of another. Soft handoffs are achieved by having the mobile-telephone maintain simultaneous radio links with multiple base stations—that is, the mobile-telephone is in communication with at least two base stations at the same time. A mobile-telephone maintaining simultaneous radio links with multiple base stations is described herein as being in a soft handoff state. The success rate of soft handoffs depends on whether the mobile-telephone can successfully receive handoff direction messages, which are messages identifying a communication channel assigned to enable a base station not already in communication with the mobile-telephone (i.e., base station to be added to soft handoff state) to communicate with the mobile-telephone. The aforementioned success rate decreases significantly when the signals carrying the handoff direction messages have low signal-to-noise ratios at the mobile-telephone.

A wireless communication systers based on the well-known IS-95 Code Division Multiple Access (CDMA) standard is described herein for purposes of providing an understanding of soft handoffs. FIG. 1 illustrates an IS-95 based CDMA wireless communication system 20 that provides wireless communication services to a geographical area 22. The geographical area 22 is divided into a plurality of cells 24-j, wherej=1, . . . , 7, which are further divided into a plurality of sectors A, B, C. Each of the cells 24-j has an associated base station 26-j, which provides wireless communication coverage to the cell. Each of the base stations 26-j is connected to a mobile switching center (MSC) 28, which is connected to a public switching telephone network (PSTN) 29. The MSC 28 includes a frame handler (FH) 30 and a call processor (CP) 32. The frame handler 30 is a device for selecting a copy of a message (among copies of the same message) with the best or acceptable signal quality, whereas the call processor 32 is a device for processing signaling messages, as will be described herein. Note that each of the base stations 26-j may also include a frame handler and/or a call processor.

Each of the base stations 26-j are operable to transmit a signal $Z_j(t)$ to one or more mobile-telephones. Typically, the signal $Z_j(t)$ includes one or more traffic channel signals, a pilot channel signal and a paging channel signal. Traffic channel signals are coded voice/data signals transmitted on communication channels referred to herein as traffic channels. When the traffic channel signals are transmitted from the base station to the mobile-telephone, such signals are referred to herein as forward (or downlink) traffic channel signals. By contrast, when the traffic channel signals are transmitted from the mobile-telephone to the base station, such signals are referred to herein as reverse (or uplink) traffic channel signals. A pilot channel signal is a pilot signal transmitted on a communication channel referred to herein as a pilot channel. The pilot channel signal provides mobile-telephones with a phase reference for coherent demodulation of forward traffic channel signals and a means for signal strength comparisons between base stations for determining when to initiate a handoff. A paging channel signal is a paging signal transmitted on a communication channel referred to herein as a paging channel. A paging signal typically includes control information, such as a notification to a mobile-telephone when a call is to be received. The manner in which the pilot channel, paging channel, traffic channel, and other communication channels are defined depends on the specific implementation of the wireless communication system.

In IS-95, downlink communication channels (from the base station to the mobile-telephone) are defined using a modulation scheme M over a specific frequency range, a pair of in-phase (I) and quadrature (Q) spreading sequences (i.e., pseudo-noise sequences $PN^{(I)}$ and $PN^{(Q)}$) with different phase offsets $P_j$ referred to herein as pseudo-noise sequences $PN^{(I)}$-j, and $PN^{(Q)}$-j, and a set of short sequences referred to herein as Walsh functions $W_i$. Each of the base stations 26-j in the wireless communication system 20 uses the same modulation scheme M. Thus, the modulation scheme M identifies a communication channel as belonging to a particular wireless communication. Each of the base stations 26-j uses the same pair of pseudo-noise sequences $PN^{(I)}$ and $PN^{(Q)}$ but different phase offsets $P_j$. The phase offsets Pj are unique for each of the base stations 26-j. Thus, the phase offset $P_j$ identifies a communication channel as belonging to a particular base station 26-j. For example, $PN^{(I)}$-1 and $PN^{(Q)}$-1 identifies the $PN^{(I)}$ and $PN^{(Q)}$ sequences and the phase offsets $P_1$ for base station 26-1. Each of the base stations 26-j uses a set of Walsh functions $W_i$ to identify particular communication channels belonging to the base station. Thus, the base stations 26-j distinguishes their communication channels using the Walsh function $W_i$.

FIG. 2 illustrates a manner in which communication channels are typically defined for each base station in an IS-95 based CDMA wireless communication system. Each base station 26-j uses the same modulation scheme M to identify the wireless communication system, the same pair of $PN^{(I)}$ and $PN^{(Q)}$ sequences but with different phase offsets $P_j$ to identify the base station (i.e., $PN^{(I)}$-j and $PN^{(Q)}$-j), and the same set of Walsh functions $W_i$ to identify a particular communication channel belonging to the base station. For example, suppose base station 26-4 uses Walsh function $W_{12}$ to define one of its forward traffic channels and base station 26-7 uses the same Walsh function $W_{12}$ to define one of its forward traffic channels. Although the same Walsh function $W_{12}$ is used by different base stations 26-4 and 26-7, the forward traffic channels are distinguishable because each of the base stations 26-4 and 26-7 defines their respective forward traffic channels using $PN^{(I)}$ and $PN^{(Q)}$ sequences with different phase offsets $P_j$, i.e., $PN^{(I)}$-4 and $PN^{(Q)}$-4 for base station 26-4 and $PN^{(I)}$-9 and $PN^{(Q)}$-9 for base station 26-9. Typically, each of the base stations 26-j uses the same particular Walsh functions $W_i$ to define its pilot channels, paging channels, and forward traffic channels. For example, Walsh functions $W_0$, $W_1$, and $W_2$, . . . $W_n$ (along with the modulation scheme M and spreading sequences $PN^{(I)}$-j and $PN^{(Q)}$-j) are used to define the pilot channel, paging channel and traffic channels at each of the base stations 26-j, respectively FIG. 3 shows a simplified schematic of a base station 26-j processing n input signals $b_i(t)$ for transmission to a multitude of mobile-telephones, where "t" represents time. The input signals $b_i(t)$ are multiplied by the base station 26-j with Walsh functions $W_i$ to produce output signals $x_i(t)$. Each of the outputs $x_i(t)$ is then multiplied by a pair of pseudo-noise sequences $PN^{(I)}$-j and $PN^{(Q)}$-j to produce a pair of in-phase and quadrature chip streams $x_i^{(I)}(t)$ and $x_i^{(Q)}(t)$, respectively. These chip streams $x_i^{(I)}(t)$ and $x_i^{(Q)}(t)$ are then filtered (using a filter, such as a low bandpass filter) and suitably amplified (with Gain-i) before all of the in-phase and quadrature chip streams $x_i^{(I)}(t)$ and the $x_i^{(Q)}(t)$ are added together to form a combined in-phase output $X^{(I)}(t)$ and a combined quadrature output $X^{(Q)}(t)$, respectively. The combined outputs $X^{(I)}(t)$ and $X^{(Q)}(t)$ are then used to respectively modulate in-phase carrier $\cos(\omega_c t)$ and quadrature carrier $\sin(\omega_c t)$, where $\omega_c$ represents the carrier frequency in radians per second. The resulting signals are added to get $Z_j(t)$ and transmitted via an antenna by the base station 26-j.

For example, suppose input signal $b_0(t)$, input signal $b_1(t)$, and input signals $b_2(t), \ldots, b_n(t)$ represent a pilot signal, a paging signal, and encoded voice/data signals, respectively. Then the pilot channel signal is the input signal $b_0(t)$ transmitted on the pilot channel defined by the pair of spreading sequences $PN^{(I0)}$-j and $PN^{(Q)}$-j, the Walsh function $W_0$, and the carriers $\cos(\omega_c t)$ and $\sin(\omega_c t)$. Likewise, the paging channel signal is the input signal $b_1(t)$ transmitted on the paging channel defined by the pair of spreading sequences $PN^{(I)}$-j and $PN^{(Q)}$-j, the Walsh function $W_1$, and the carriers $\cos(\omega_c t)$ and $\sin(\omega_c t)$, and the traffic channel signals are the input signals $b_2(t), \ldots, b_n(t)$ transmitted on the traffic channels defined by the pair of spreading sequences $PN^{(I)}$-j and $PN^{(Q)}$-j, the Walsh functions $W_2, \ldots, W_n$, and the carriers $\cos(\omega_c t)$ and $\sin(\omega_c t)$.

The signal $Z_j(t)$ transmitted from a base station 26-j will typically travel several paths to a mobile-telephone—that is, a single signal $Z_j(t)$ may arrive as multiple signals via different paths to the mobile-telephone. Such signals are referred to herein as multi-path signals $Z_{j,m}(t)$, where m indicates a specific multi-path for signal $Z_j(t)$. IS-95 based mobile-telephones include RAKE receivers which use the multi-path environment to improve the performance of the mobile-telephones. RAKE receivers include a plurality of "fingers" (i.e., devices capable of demodulating received signals) for separately demodulating several multi-path signals and a summer for combining the demodulated multi-path signals to produce a net overall output, i.e., obtain a single strong signal, as will be described herein.

Referring to FIG. 4, there is shown a schematic of a mobile-telephone 33 having an antenna 34 and a RAKE receiver 36, which includes a searcher 38, a controller 40, a plurality of fingers 42-1, 2, 3, and a summer 43. Searchers, controllers, fingers and summers are well-known in the art. The antenna 34 receives a plurality of multi-path signals $Z_{j,m}(t)$. The searcher 38, under the direction of the controller 40, scans for pilot channel signals (being received via the multi-path signals) transmitted from base stations in an active set and/or a neighbor set of base stations, as will be described herein. The active set includes base stations that are in communication with the mobile-telephone. Note that a base station and a mobile-telephone are in communication with each other when the base station listens to messages transmitted by the mobile-telephone and vice-versa. The active set typically includes a primary base station, i.e., base station in control of call processing for the mobile-telephone, and zero or more secondary base stations, i.e., base stations in communication with the mobile-telephone other than the primary base station. The neighbor set includes base stations that are close and/or adjacent to the primary base station. The primary base station provides the mobile-telephone with a list indicating the base stations in the active set and the neighbor set.

In IS-95 based mobile telephones, the searcher 38 scans for the aforementioned pilot channel signals within search windows corresponding to the phase offsets $P_j$ associated with the base stations in the active set and/or neighbor set, wherein search windows are time intervals around the phase offsets $P_j$ of the base stations 26-j. Recall that in IS-95 based CDMA wireless communication systems, each base station 26-j is typically configured to transmit signals, including the pilot signal, using communication channels defined by a unique phase offsets $P_j$. The phase offsets $P_j$ allows the mobile-telephone to identify the base station from which a pilot channel signal was transmitted. For example, if a pilot channel signal was detected within a search window around a phase offset $P_2$, then the mobile-telephone may conclude that the corresponding multi-path signal $Z_{j,m}(t)$ was transmitted by base station 26-2.

Upon detecting the pilot channel signals (within the appropriate search windows), the searcher 38 records the phases at which the pilot channel signals were actually detected and the corresponding signal strengths. The recorded phases and signal strengths are sent to the controller 40. The controller 40 uses this information to instruct the fingers 42-1, 2, 3 to lock on to particular multi-path signals and extract the desired input signals $b_i(t)$. For example, suppose the base station 26-3 is communicating with the mobile-telephone 33 over a forward traffic channel defined using the Walsh function $W_2$. In this scenario, the controller instructs the fingers 42-1, 2, 3 to extract the coded voice/data signal $b_2(t)$ from the three strongest multi-path signals belonging to the base station 26-3, e.g., $Z_{3,2}(t)$, $Z_{3,5}(t)$ and $Z_{3,6}(t)$. The outputs of the fingers 42-1, 2, 3 are combined by the summer 43 to produce a net overall gain for the coded voice/data signal $b_2(t)$, i.e., a single stronger signal $b_2(t)$.

FIG. 5 depicts a simplified schematic of a finger 42-k extracting the coded voice/data signal $b_2(t)$ from a received multi-path signal $Z_{j,m}(t)$. Note that in order to extract the coded voice/data signal $b_2(t)$ from the received multi-path signal $Z_{j,m}(t)$, the finger 42-k de-spreads the pilot channel signal and the appropriate traffic channel signal received via the multi-path signal $Z_{j,m}(t)$, as will be described herein. The front end of the mobile telephone receiver comprises RF/IF circuitry (which precedes the RAKE receiver), which frequency shifts the multi-path signal $Z_{j,m}(t)$ to base-band using locally generated carriers $\cos(\omega_c t + \phi)$ and $\sin(\omega_c t + \phi)$, where $\phi$ represents the phase difference between the carrier signal in a given multi-path and its locally generated replica at the mobile telephone. The resulting base-band signals $y^{(I)}(t)$ and $y^{(Q)}(t)$ are then filtered and de-spread. Specifically, the filtered base-band signals $y^{(I)}(t)$ and $y^{(Q)}(t)$ are de-spread using the Walsh function $W_0$ and the spreading sequences $PN^{(I)}$-j and $PN^{(Q)}$-j to obtain de-spread pilot channel signals $\Pi^{(I)}$ and $\Pi^{(Q)}$, where $\Pi^{(I)} = a\cos\phi + \text{noise}$, $\Pi^{(Q)} = a\sin + \phi\text{noise}$ and "a" represents the amplitude of the pilot channel signal as a function of time. Likewise, the filtered base-band signals $y^{(I)}(t)$ and $y^{(Q)}(t)$ are de-spread using the Walsh function $W_2$ and the spreading sequences $PN^{(I)}$-j and $PN^{(Q)}$-j to obtain de-spread traffic channel signals $\tau^{(I)}$ and $\tau^{(Q)}$, where $\tau^{(I)} = b_2\cos\phi + \text{noise}$ and $\tau^{(Q)} = b_2\sin\psi + \text{noise}$.

Note that de-spreading the filtered base-band signals $y^{(I)}(t)$ and $y^{(Q)}(t)$ using the spreading sequence $PN^{(I)}$-j and $PN^{(Q)}$-j suppresses the interference due to the transmission of signals by other base stations in the same wireless communication system, thereby enhancing the quality (at the mobile-receiver) of the signals transmitted from the desired base station 26-j—that is, signals transmitted from the desired base station 26-j are made available. Further note that the use of Walsh functions $W_i$ to distinguish between communication channels minimizes interference due to the transmission of signals by the same base station 26-j to other users in the same coverage area.

Each of the de-spread pilot channel signals $\Pi^{(I)}$ and $\Pi^{(Q)}$ are typically averaged over a few symbols (i.e., bits of convolutional coder output) to suppress noise (i.e., $\overline{\Pi}^{(I)}$ and $\overline{\Pi}^{(Q)}$ and then used to coherently demodulate the de-spread traffic channel signals $\tau^{(I)}$ and $\tau^{(Q)}$ to produce a demodulated signal $b''_2(t)$, where $b''_2(t) = \overline{\Pi}^{(I)} \cdot \tau^{(I)} + \overline{\Pi}^{(Q)} \cdot \tau^{(Q)}$. The demodulated signal $b''_2(t)$ at the output of a RAKE receiver finger may be delayed for a duration corresponding to the phase offset associated with the corresponding multi-path and then combined with the outputs of other fingers (similarly delayed to account for different path delays) to produce a single output with an enhanced signal-to-noise ratio—that is, the output of a RAKE receiver finger is time aligned with the outputs of other RAKE receiver fingers. Such combined output, generated once every coded symbol, is then de-interleaved and fed to a Viterbi decoder, not shown, to extract the desired voice/data signal.

One of the major benefits provided by a RAKE receiver is the ability to simultaneously demodulate multi-path signals from more than one base station. This functionality allows the IS-95. based wireless communication system and mobile-telephone to perform soft handoffs. Soft handoffs will now be described using FIG. 6, which is a simplified schematic of the above-described wireless communication system 20 and base stations 26-4 and 26-3. Suppose mobile-telephone 33 is currently within the coverage area of the base station 26-4, i.e., cell 24-4, and listening to (i.e., demodulating) messages transmitted by the base station 26-4 over a first communication channel $C_4$ assigned to enable the base station 26-4 to communicate with the mobile-telephone 33. Note that the base station 26-4 is the primary base station. As the mobile-telephone 33 moves near the coverage area of the base station 26-3, i.e., cell 24-3, a soft handoff is initiated. Note that the base station 26-3 is now a candidate base station, i.e., a base station to which a soft handoff is requested. Upon initiation of the soft handoff, the network connections necessary for the soft handoff are set up by the wireless communication system, including assigning a second communication channel $C_3$ to enable the candidate base station 26-3 to communicate with the mobile-telephone 33. A copy of a handoff direction (HD) message indicating the identity of the candidate base station, as well as that of the second communication channel $C_3$, is transmitted (via the signal $Z_j(t)$) to the mobile-telephone 33 by the primary base station 26-4 over the first communication channel $C_4$. Upon receipt of the HD message, the mobile-telephone 33 is in a soft handoff state and will begin listening to messages transmitted on the second communication channel $C_3$ in addition to messages transmitted on the first communication channel $C_4$—that is, the mobile-telephone 33 is maintaining simultaneous radio links with both of the base stations 26-4 and 26-3.

Typically, during the network connections set up for the soft handoff (and before transmittal of the HD message) the mobile-telephone will move farther from the primary base station 26-4 and closer to the candidate base station 26-3. This will cause the signal-to-noise ratio of multi-path signals $Z_{j,m}(t)$ containing the HD message (transmitted after completion of the network connections set up) to decrease significantly which, in turn, decreases the likelihood that the HD message will be successfully received by the mobile-telephone. Such failure prevents the mobile-telephone from attaining a soft handoff state (since it would not know the identity of the second communication channel $C_3$)—that is, the mobile-telephone 33 will not know to listen to messages transmitted from the base station 26-3 on the second communication channel. As a result of not attaining the soft handoff state, the mobile-telephone 33 will be unable to keep the call active as the mobile-telephone 33 moves farther away from the primary base station 26-4 and towards the candidate base station 26-3—that is, the mobile-telephone may lose the call. This is one major reason for decreasing soft handoff success rate. Accordingly, there exists a need to increase the success rate of soft handoffs.

SUMMARY OF THE INVENTION

The present invention increases the success rate of soft handoffs by enhancing the ability of a mobile-telephone to receive a handoff direction message that identifies the traffic channel being assigned to enable a candidate base station to communicate with the mobile-telephone. Specifically, the aforementioned ability of the mobile-telephone is enhanced by using the candidate base station to transmit the handoff direction message on a communication channel belonging to the candidate base station and being listened to by the mobile-telephone. In situations where signals transmitted from active set base stations have a low signal-to-noise ratio at the mobile-telephone, signals transmitted from the candidate base station may have a higher signal-to-noise ratio at the mobile-telephone. In these situations, the transmission of the HD messages from the candidate base station increases the likelihood that a copy of the handoff direction message will be successfully received by the mobile-telephone, thereby enhancing the success rate of soft handoffs. In one embodiment, the mobile-telephone will use at least one of its RAKE receiver fingers to listen to the paging channel of the candidate base station when a soft handoff is initiated. At the same time, the candidate base station transmits on its paging channel a copy of the handoff direction message along with an identifier indicating that the handoff direction message is intended for the mobile-telephone. Upon receiving the copy of the handoff direction message (via the candidate base station's paging channel), the mobile-telephone will know to listen to the traffic channel identified in the handoff direction message. In another embodiment, base stations in an active set of base stations also transmit copies of the handoff direction message on forward traffic channels already being used by each of the base stations in the active set to communicate with the mobile-telephone.

BRIEF DESCRIPTION OF THE DRAWINGS

The features, aspects, and advantages of the present invention will become better understood with regard to the following description, appended claims, and accompanying drawings where:

FIG. 6 depicts a simplified schematic of base stations 26-3 and 26-4 of FIG. 1 processing a soft handoff;

FIG. 7 depicts a flowchart illustrating a soft handoff from the perspectives of a mobile-telephone; and FIG. 8 depicts a flowchart illustrating a soft handoff from the perspectives of a wireless communication system.

DETAILED DESCRIPTION

Figure 1:
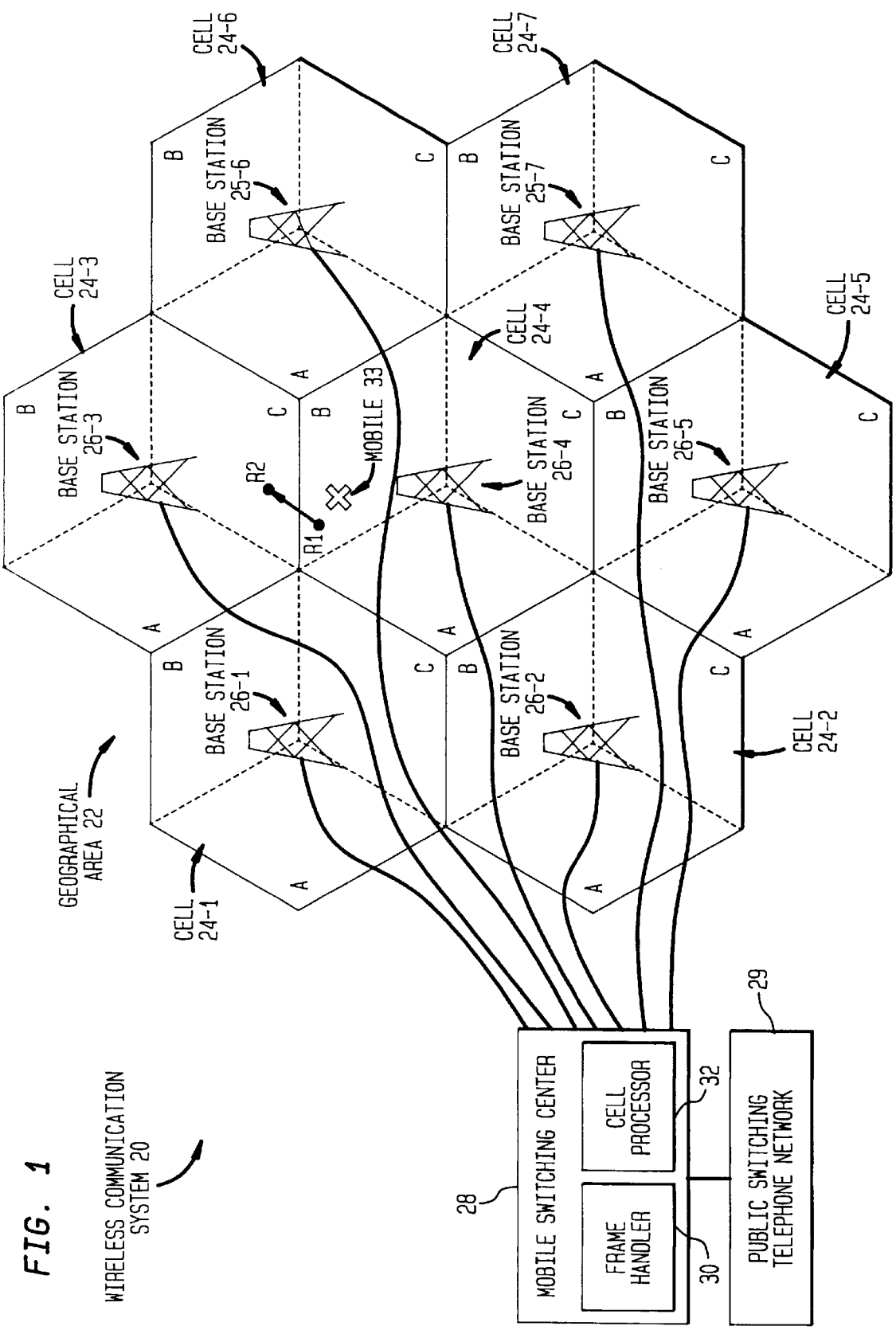
FIG. 1 depicts a wireless communication system.
Figure 2:
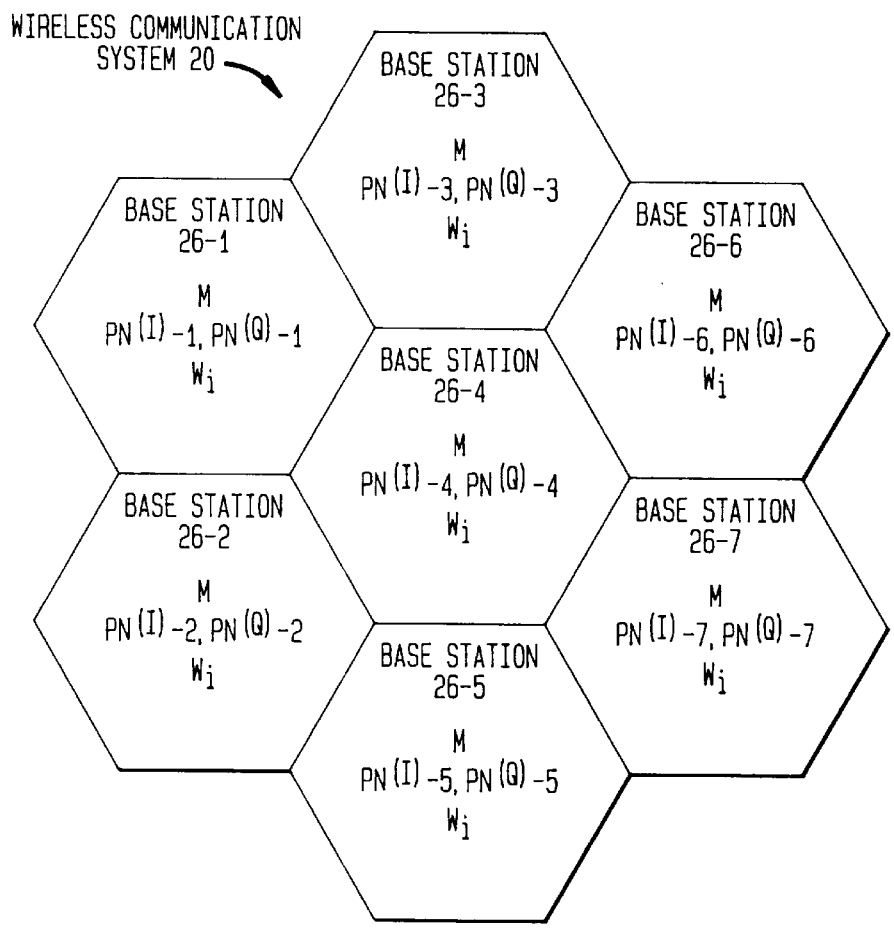
FIG. 2 depicts how communication channels are typically defined in an IS-95 based CDMA wireless communication system.
Figure 4:
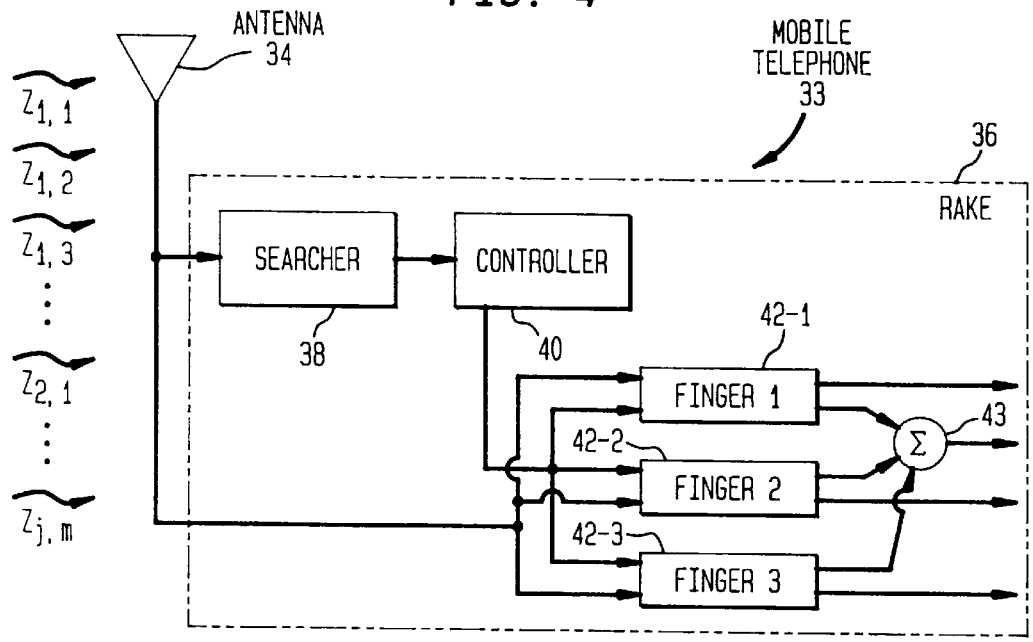
FIG. 4 depicts a simplified schematic of a mobile-telephone having an antenna and a RAKE receiver.
Figure 3:
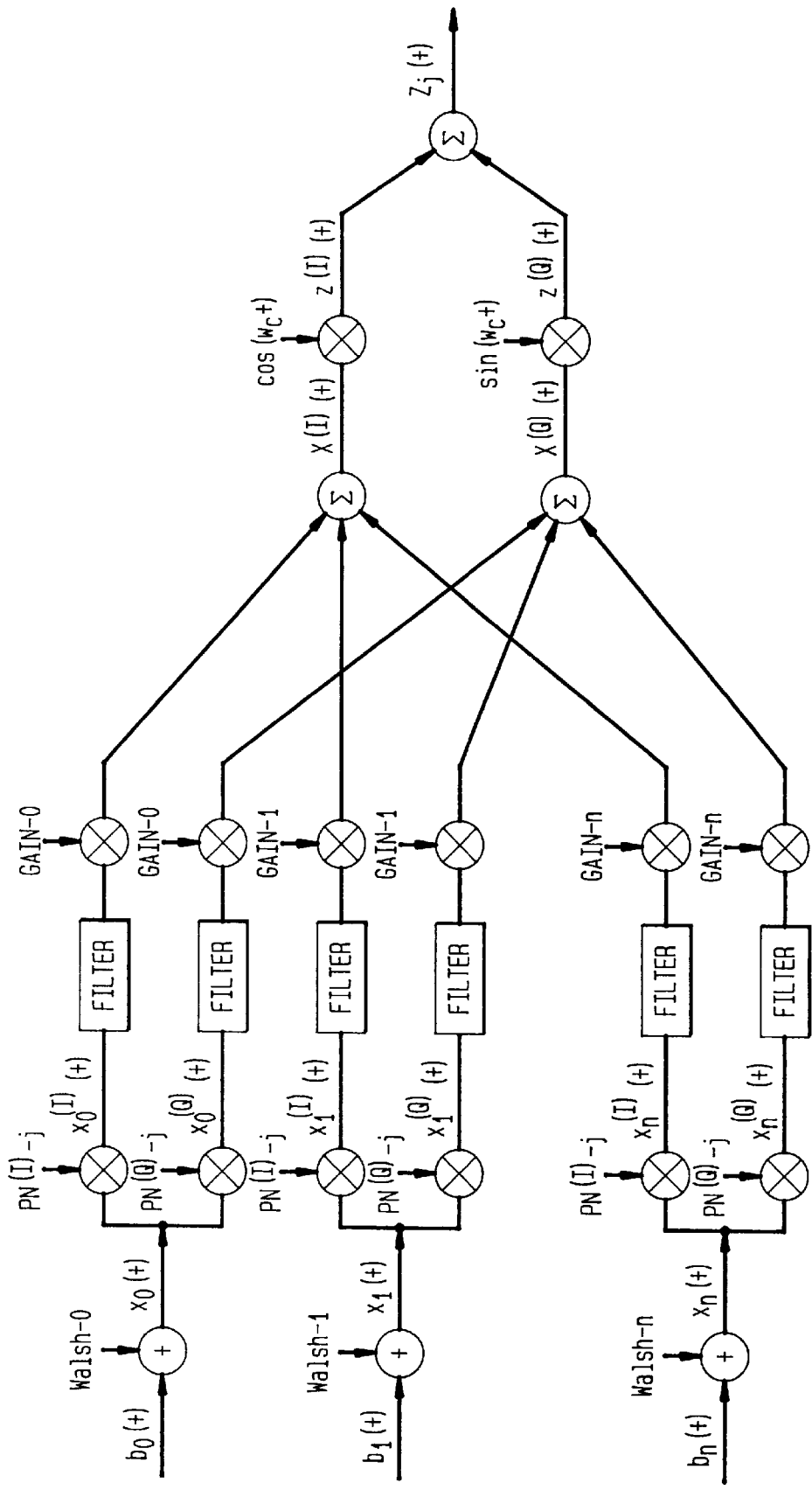
FIG. 3 depicts a simplified schematic of a base station processing input signals for transmission to a multitude of mobile-telephones.
Figure 5:
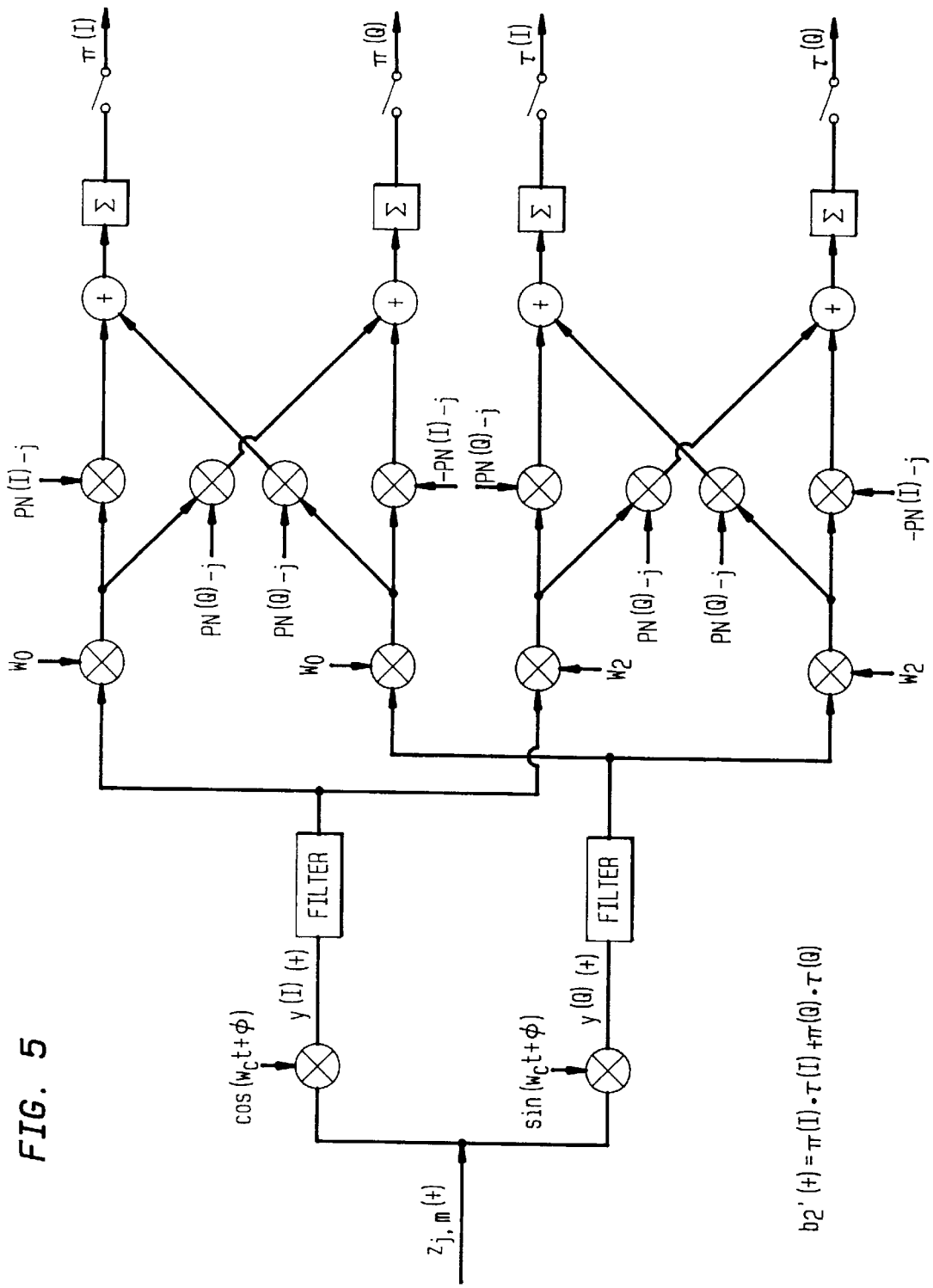
FIG. 5 depicts a simplified schematic of a finger extracting the coded voice signal from a received multi-path signal.

For purposes of discussion, the present invention will be described herein with respect to the above-described wireless communication system and mobile-telephone employing Code Division Multiple Access (CDMA) techniques based on the well-known IS-95 wireless communication standards. The present invention can be equally applicable to wireless communication systems employing other CDMA techniques (e.g. ones based on the ANSI J 008 standard) or those employing other types of multiple access techniques, such as time division multiple access (TDMA) and frequency division multiple access.

As mentioned earlier, one of the major benefits provided by a RAKE receiver is the ability to simultaneously demodulate multi-path signals from more than one base station. This functionality allows the IS-95 based wireless communication system and mobile-telephone to perform soft handoffs. The present invention extends this functionality to enhance soft handoffs. Specifically, the present invention dedicates one of the mobile-telephone's RAKE receiver fingers to listen to a communication channel belonging to the candidate base station for some time interval corresponding to the possible arrival of copies of a HD message. During or immediately the aforementioned time interval, the candidate base station (and/or other base stations) will transmit the copies of the HD message (via signals $Z_j(t)$).

FIGS. 7 and 8 depict flowcharts 60 and 70 illustrating a soft handoff from the perspectives of a mobile-telephone and a wireless communication system, respectively, in accordance with one embodiment of the present invention. In step 600, a mobile-telephone is engaged in a call. At this time, the fingers of the mobile-telephone are dedicated to extracting a coded voice/data signal $b_q(t)$, where q=2, . . . , n, from one or more multi-path signals $Z_{j,m}(t)$ transmitted by base stations in the active set—that is, the fingers are listening to one or more of the active base stations' assigned forward traffic channels, i.e., forward traffic channels assigned to enable the active set base stations to communicate with the mobile-telephone. In step 605, a soft handoff is initiated by the mobile-telephone when the mobile-telephone detects a pilot channel signal from a base station in the neighbor set with a strength exceeding a threshold T_ADD. This base station is now a candidate base station.

In step 610, the mobile-telephone transmits a pilot strength measurement (PSM) message indicating the detection of the candidate base station. The PSM message is transmitted in-band on a reverse traffic channel assigned to enable the mobile-telephone to communicate with the base stations in the active set. In other words, the mobile-telephone transmits a PSM message on a reverse traffic channel which is being listened to by the base stations in the active set. In step 615, the mobile-telephone sets a timer to expire after a time interval T_Listen and dedicates a subset of fingers (for the time interval T_Listen or part thereof) to listen to the paging channel belonging to the candidate base station. Such dedicated subset of fingers is hereinafter referred to as the paging channel fingers. Recall that a communication channel, such as the paging channel, is described herein as belonging to a base station 26-j if the communication channel is defined using the $PN^{(I)}$ and $PN^{(Q)}$ sequences with the phase offset $P_j$ of the base station 26-j.

Note that the fingers not dedicated to the paging channel, i.e., traffic channel fingers, remain dedicated to listening to the active set base stations' assigned forward traffic channels. Further note that the present invention is not limited to receiving (or transmitting) the HD message over the candidate base station's paging 15 channel. Such message may be received (or transmitted) over any communication channel belonging to the candidate base station so long as the mobile-telephone knows or can ascertain the identity of such communication channel. In other words, the mobile-telephone should have a priori knowledge of the communication channel over which the candidate base station will transmit the HD message (so that a subset of fingers may be dedicated to listen to that communication channel). The paging channel is one possibility In step 620, the mobile-telephone checks if one or more copies of the HD message (intended for the mobile-telephone) was received over the candidate base station's paging channel and/or one of the active set base stations' assigned forward traffic channels. An identifier indicating the particular mobile-telephone to which the HD message is intended, such as a mobile-telephone identification number (MIN), is also transmitted over the candidate base station's paging channel along with the copy of the handoff direction message. The identifier allows the mobile-telephone to determine whether to process the associated HD message. If no copy of the HD message was received, the mobile-telephone checks whether the timer has expired, i.e., time interval T_Listen has elapsed, in step 625. If the timer expired, then the mobile-telephone re-dedicates the paging channel fingers to listen to one of the active set base stations' assigned forward traffic channels, in step 630. If the timer did not expire, then the mobile-telephone repeats step 620.

If a copy of the HD message is received over the candidate base station's paging channel or one or more of the active set base stations' assigned traffic channel, then the mobile-telephone re-dedicates the paging channel fingers to demodulate the active set base stations' assigned traffic channel and adds the candidate base station to its active set of base stations (after extracting the HD message), in step 635—that is, the candidate base station becomes a secondary base station to which the mobile-telephone will listen (in addition to all of the other base stations which were already in the mobile-telephone's active set). Alternately, the candidate base station can replace the primary base station, thus becoming the primary base station. Upon completion of step 635, the mobile-telephone is in a soft handoff state with the candidate base station as well as those that are already in its active set.

Note that the output of the paging channel fingers is not combined with the output of the traffic channel fingers. Message level selection diversity is expanded to include messages transmitted by the candidate base station over its paging channel. Specifically, message level selection diversity is employed to enable the mobile-telephone to receive the HD message if either the candidate base station or the active set base stations are able to deliver the HD message at a reasonable signal to noise ratio.

Meanwhile, the following occurs at the wireless communication system during the time interval T_Listen. In step 700, the active set base stations that receive the PSM message (transmitted in step 610) will demodulate their PSM message and send the demodulated PSM message to a common frame handler where, in step 705, the PSM message with the best or acceptable, e.g., over a threshold, signal quality is selected. In step 710, the selected PSM message is routed to a call processor (CP) where, in step 715, the PSM message is used by the CP to set up the network connections necessary for performing the soft handoff.

Network connections setup (for soft handoffs) involves messaging or interaction between the CP, the candidate base station, and the network infrastructure of the wireless communication system. Specifically, in step 715, the CP sends a message to the candidate base station requesting a new forward traffic channel be assigned to enable the candidate base station to communicate with the mobile-telephone, and informing the candidate base station of the reverse traffic channel being used by the mobile-telephone (so the candidate base station knows what reverse traffic channel to which it should listen). At the same time, the CP interacts with the network infrastructure to set up a link or a connection between the candidate base station and the frame handler. This enables proper routing of messages (to and from the mobile-telephone) between the candidate base station and the frame handler.

Upon completing the network connections setup, in step 720, the CP sends copies of a handoff direction (HD) message to the active set base stations and the candidate base station. The HD message indicates the identity of the candidate base station and new forward traffic channel being assigned to enable the candidate base station to communicate with the mobile-telephone. In step 725, the active set base stations and the candidate base station transmit the copies of the HD message to the mobile-telephone. Specifically, the active set base stations synchronously transmit the copies of the HD message using the forward traffic channels assigned to enable them to communicate with the mobile-telephone, and the candidate base station (non-synchronously or synchronously) transmits the HD message with a mobile-telephone identification number (MIN) to the mobile-telephone using the paging channel of the candidate base station—that is, all of the base stations in the active set transmits the HD message at the same time, and the candidate base station transmits the HD message at a different time or the same time. Recall that the MIN identifies the mobile-telephone as the intended recipient of the handoff direction message.

Transmitting a copy of the HD message from the candidate base station will increase the likelihood of successful receipt of the HD at the mobile-telephone. For example, referring back to FIG. 6, suppose the base station 26-4 is one of the active set base stations and the base station 26-3 is the candidate base station. During the setting up of the soft handoff network connections (i.e., step 715), the mobile-telephone 33 moves from position R1 to position R2. At position R2 (as opposed to position R1), the signal-to-noise for signals transmitted by the active set base station 26-4 decreases and the signal-to-noise ratio for signals transmitted by the candidate base station 26-3 increases. In this situation, it is more likely that a HD message transmitted from the candidate base station 26-3 will be correctly received than a HD message transmitted from the active set base station 26-4.

In step 730, the candidate base station will begin to carry the call over the newly assigned forward traffic channel upon completion of the network connections setup—that is, the candidate base station will carry copies of forward link transmissions on the newly assigned forward traffic channel, and demodulate the mobile-telephone's reverse link transmissions (and pass them to the frame handler).

Although the present invention has been described in considerable detail with reference to certain embodiments, other versions are possible. The present invention can be equally applicable to "softer handoffs" and hard handoffs. Therefore, the spirit and scope of the present invention should not be limited to the description of the embodiments contained herein.

We claim:

1. A method for performing a handoff in a wireless communication system having a plurality of base stations including a candidate base station, the method comprising the steps of:

assigning a first communication channel to enable the candidate base station to communicate with a mobile-telephone; and transmitting a message from the candidate base station identifying the first communication channel, the message being transmitted over a second communication channel belonging to the candidate base station and being listened to by the mobile-telephone.

2. The method of claim 1, wherein the second communication channel is a paging channel belonging to the candidate base station.

3. The method of claim 1, wherein the step of transmitting the message includes the step of:

transmitting an identifier over the second communication channel indicating the mobile-telephone to which the message is intended.

4. The method of claim 3, wherein the identifier is a mobile-telephone identification number that uniquely identifies the mobile-telephone.

5. The method of claim comprising the additional step of:

transmitting a pilot signal from the candidate base station over a third communication channel belonging to the candidate base station.

6. The method of claim 1 comprising the additional step of:

transmitting the message from a base station in an active set of base stations over a third communication channel assigned to enable the base station in the active set to communicate with the mobile-telephone, the plurality of base stations having at least one base station in the active set.

7. The method of claim 1 comprising the additional step of:

receiving a second message at a base station in an active set of base stations over a third communication channel assigned to enable the mobile-telephone to communicate with the base station in the active set, the plurality of base stations having at least one base station in the active set.

8. The method of claim 7, wherein the second message indicates the candidate base station.

9. The method of claim 1, wherein the wireless communication system employs code division multiple access techniques.

10. A method for performing a handoff in a wireless communication system having a plurality of base stations, wherein at least one of the plurality of base stations is in an active set of base stations, the method comprising the steps of:

transmitting a first message from a mobile-telephone indicating a candidate base station, the first message being transmitted over a first communication channel being used to enable the mobile-telephone to communicate with a base station in the active set; and listening at the mobile-telephone to a second communication channel belonging to the candidate base station and being used by the candidate base station to transmit a second message identifying a third communication channel assigned to enable the candidate base station to communicate with the mobile-telephone.

11. The method of claim 10, wherein the mobile-telephone listens to the second communication channel until a time interval lapses.

12. The method of claim 10 comprising the additional step of:

receiving the second message at mobile-telephone over the second communication channel.

13. The method of claim 12 comprising the additional step of:

receiving a pilot signal at the mobile-telephone from the candidate base station over a fourth communication channel.

14. The method of claim 13 comprising the additional step of:

demodulating the second message using the pilot signal.

15. The method of claim 10 comprising the additional step of:

listening at the mobile-telephone to a fourth communication channel being used by the base station in the active set to communicate with the mobile-telephone.

16. The method of claim 15 comprising the additional step of:

receiving the second message over the fourth communication channel.

17. The method of claim 16 comprising the additional step of:

receiving a pilot signal at the mobile-telephone from the base station in the active set over a fifth communication channel.

18. The method of claim 17 comprising the additional step of:

demodulating the second message using the pilot signal.

19. The method of claim 10, wherein the mobile-telephone has a RAKE receiver with a plurality of fingers.

20. The method of claim 19, wherein the mobile-telephone dedicates a subset of the plurality of fingers to listen to the second communication channel.

21. The method of claim 20, wherein the subset of plurality of fingers is dedicated to the second communication channel until a time interval lapses.

22. The method of claim 20, wherein the subset of plurality of figures is dedicated to the second communication channel until the second message is received by the mobile-telephone.

23. The method of claim 20, wherein the mobile-telephone dedicates a second subset of the plurality of fingers to listen to a fourth communication channel being used to enable the base station in the active set to communicate with the mobile-telephone.

24. The method of claim 23 comprising the additional step of:

receiving the second message over the second communication channel.

25. The method of claim 24 comprising the additional step of:

receiving the second message over the fourth communication channel.

* * * * *